May 6, 1952 R. W. LEE ET AL 2,595,397

ELECTRONIC TELEVISION SHUTTER

Filed Dec. 1, 1948 5 Sheets-Sheet 1

Inventors
RICHARD W. LEE
LOUIS L. POURCIAU

By

H. A. Mackey
Attorney

ELECTRONIC TELEVISION SHUTTER

Filed Dec. 1, 1948 5 Sheets-Sheet 2

Inventors
RICHARD W. LEE
LOUIS L. POURCIAU
By
H. S. Mackey
Attorney

May 6, 1952 R. W. LEE ET AL 2,595,397

ELECTRONIC TELEVISION SHUTTER

Filed Dec. 1, 1948 5 Sheets-Sheet 3

Inventors
RICHARD W. LEE
LOUIS L. POURCIAU

By H. L. Mackey
Attorney

May 6, 1952 R. W. LEE ET AL 2,595,397

ELECTRONIC TELEVISION SHUTTER

Filed Dec. 1, 1948 5 Sheets-Sheet 4

Inventors
RICHARD W. LEE
LOUIS L. POURCIAU

By H. L. Mackey

Attorney

May 6, 1952 R. W. LEE ET AL 2,595,397

ELECTRONIC TELEVISION SHUTTER

Filed Dec. 1, 1948 5 Sheets-Sheet 5

Inventors
RICHARD W. LEE
LOUIS L. POURCIAU

By H. L. Mackey
Attorney

Patented May 6, 1952

2,595,397

UNITED STATES PATENT OFFICE 2,595,397

ELECTRONIC TELEVISION SHUTTER

Richard W. Lee and Louis L. Pourciau, Pleasantville, N. Y., assignors to General Precision Laboratory Incorporated, a corporation of New York Application December 1, 1948, Serial No. 62,832

13 Claims. (Cl. 178—7.4)

This invention relates to a device for periodically blanking the screen of a cathode ray tube and is particularly applicable to a system wherein received television images depicted on the cathode ray tube are periodically recorded on an intermittently advanced motion picture film.

In the United States, television signals are transmitted at a standard frequency of 30 frames or complete picture repetitions a second. Generally speaking interlaced scanning is employed so that each frame is composed of two vertical sweeps or scans of alternate horizontal lines. Thus the picture field is covered twice for each frame or complete picture and these scans are transmitted at a rate of 60 per second.

On the other hand motion pictures are recorded and projected at the rate of 24 frames per second. Necessarily, then, if standard television signals are to be converted to standard motion picture images, two motion picture images must be produced for every five television scans transmitted and received.

In addition to the conversion in frequency of repetition, time must be allowed for the advancing of the film and during this time of advance or pulldown of the film no image may be allowed to reach the film. Mechanical shutters on the camera have been used for this purpose but in the instant invention an electronic switch means is utilized to apply such a potential to a control electrode of the cathode ray tube as to blank the screen thereof for the requisite amount of time. This device will hereinafter be referred to as an electronic shutter because of its analogy in function to the more commonly known mechanical shutter.

The time required for the shuttering operation during which the pulldown of the film occurs must be subtracted from the time during which television pictures are transmitted but since the existing standards require that five television scans be converted to two motion picture frames the time of one television scan may be used for two pulldown periods. That is to say, the light of two complete television scans are allowed to impinge on the film and then the electronic shutter is operated to darken the cathode ray tube screen for a period of approximately one-half a television scan while the film is being advanced, a fairly rapid intermittent movement being employed so that the film may be advanced in the allowable time. The light is then allowed to impinge on the film for a period of time equal to the time of two television scans and the cathode ray tube screen again blanked for a period of time such that the sum of the first blanking period and the second are exactly equal to the time interval required to produce one television scan.

It is not necessary that the beginning of a television scan correspond to the initial edge of a film frame since if one complete television picture and no more or less is allowed to reach the film it is unimportant whether it begin at the initial edge, a third of the way down or some other point as in every case the film frame will be completely scanned twice, the termination of the scan corresponding in position to exactly the position of the beginning regardless of where that is on the film frame.

Likewise it is not important that the blanking time be exactly equal to one half of a television scan. All that is of importance is that it be a period long enough to permit the pulldown to act so that no light strikes the film while it is moving and that the total time taken by two successive periods be equal to one television scan.

What is of the utmost importance, however, is that the film be illuminated for exactly the time required for two television scans and that the blanking time be such that the sum of any two successive blanking times be exactly equal to the time of one television scan and no more or less.

Prior systems have been devised in which by mechanical shutters or what has here been termed an electronic shutter the light reaching the film has been blocked for two periods in every five television scans, the sum of the periods being equal to the time of one television scan. In these systems, however, the action of the shutter has been synchronized with the 60 cycle frequency derived from the alternating current mains or the vertical synchronizing signals of the television transmitter occurring at the rate of 60 per second. In such systems, however, it has been impossible to obtain and maintain such exact synchronism that there would be no overlapping or gaps in the horizontal scans or lines of the television picture as it is projected on the film.

In the present invention the horizontal lines or scans themselves are used to define the critical time periods so that in no event are there fractions of lines missing resulting in the darkening of lines or portion of lines in the film picture or its converse the overlapping of lines producing a bright area.

The present invention, therefore, has for its primary purpose the provision of a system such that the periods of illumination and darkening of the film strip are defined by the horizontal line or scan frequency, certain selected and definite ones of such lines being utilized to initiate and terminate the action of an electronic shutter.

This invention will be more readily understood from the following detailed description, considered together with the attached drawings in which.

Figure 1:
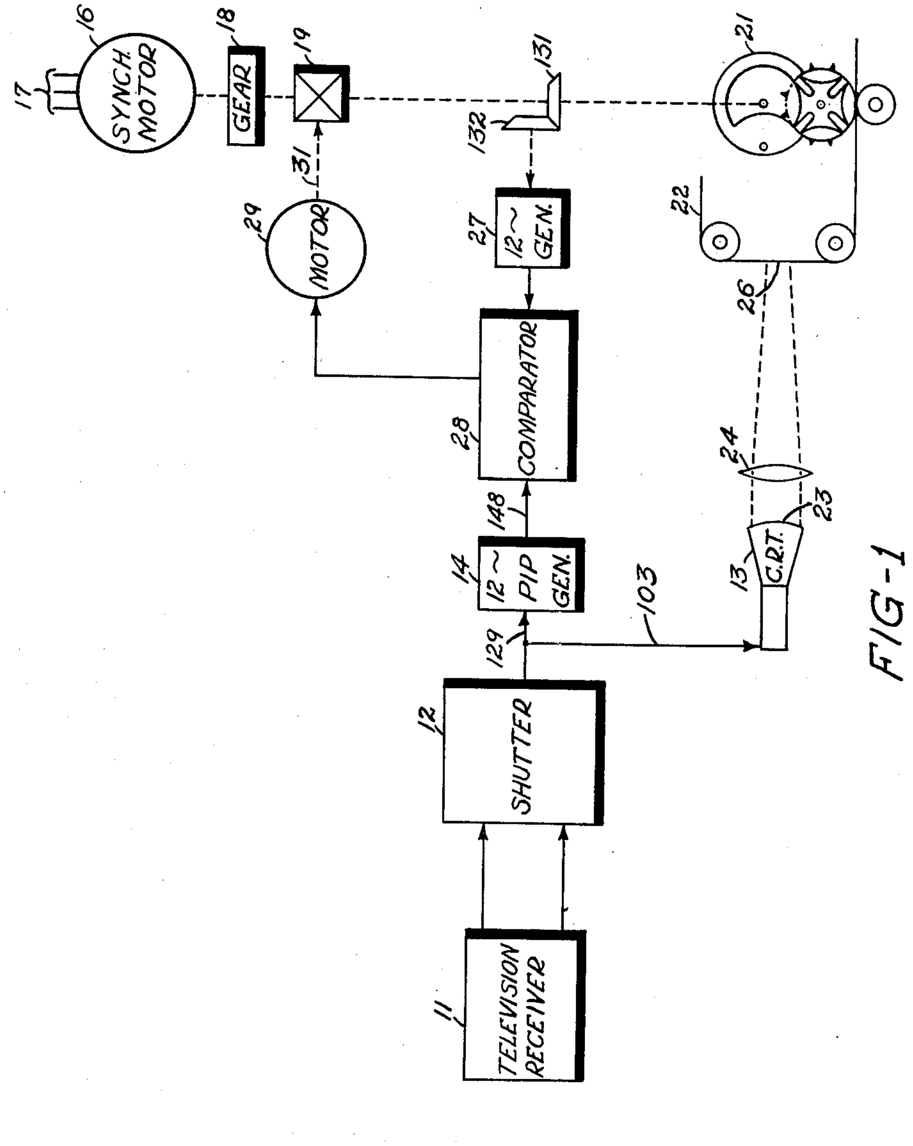
Figure 1 illustrates schematically the general arrangement of the television recorder components.

In Fig. 1 vertical and horizontal trigger pulses from a television receiver 11 actuate a blanking control circuit 12, which constitutes the electronic shutter to turn the cathode ray tube 13 screen display on and off at proper intervals. Blanking pulses also actuate a pip-generating circuit 14. The frequency of the pips generated by this circuit equals the cyclic frequency of the shutter 12 which, as will be shown, equals one-fifth the vertical synchronizing pulse frequency or approximately 12 cycles. The motion picture camera comprises a synchronous motor 16 operated from local 60-cycle power mains 17 which may or may not be on the same power system as the mains supplying the television transmitter. The motor through step-down gears 18 and a set of mechanical differential gears 19 operates the intermittent mechanism 21 which advances or "pulls down" the sensitized motion picture film 22 every one twenty-fourth second. Meanwhile the screen 23 of cathode ray tube 13, being illuminated at selected intervals, emits light which is collected and focused by an optical system represented diagrammatically by lens 24 upon film 22 at the fixed frame location 26. In the mechanical drive between differential 19 and intermittent movement 21 a mechanical takeoff, which may be a pair of bevel gears 131 and 132, actuates a sinusoidal generator 27, which generates a potential of the same frequency as that of the pip generator 14, and whose frequency and phase are representative of the cyclic frequency and phase of the operation of intermittent movement 21. The output of this generator and also the output of pip generator 14 both actuate a comparator 28, which compares the 12-cycle pips with the 12-cycle waves and derives from them a correction signal representing in sense and amount any difference in phase which may exist between the two signals. This correction signal is made to operate a motor 29 which introduces by means of differential 19 a shaft rotation of precisely the right sense and amount to maintain the motion of the film 22 in phase with the operation of the shutter 12 at all times by algebraically adding the rotation of differential input shaft 31 to the output rotation of gear 18. This shaft rotation may be merely a displacement correction effected at the beginning of the motion picture photographing process if synchronous motor 16 and the television transmitter are both on the same power system or on synchronized power systems, being therefore an initial phasing operation. If, however, the motor and transmitter are on different power systems not synchronized with each other, the shaft rotation must proceed continuously, so that in addition to effecting an initial displacement correction or phasing, the differential leg 31 introduces a speed correction which serves as a synchronization of the intermittent movement with the blanking control.

Figure 2:
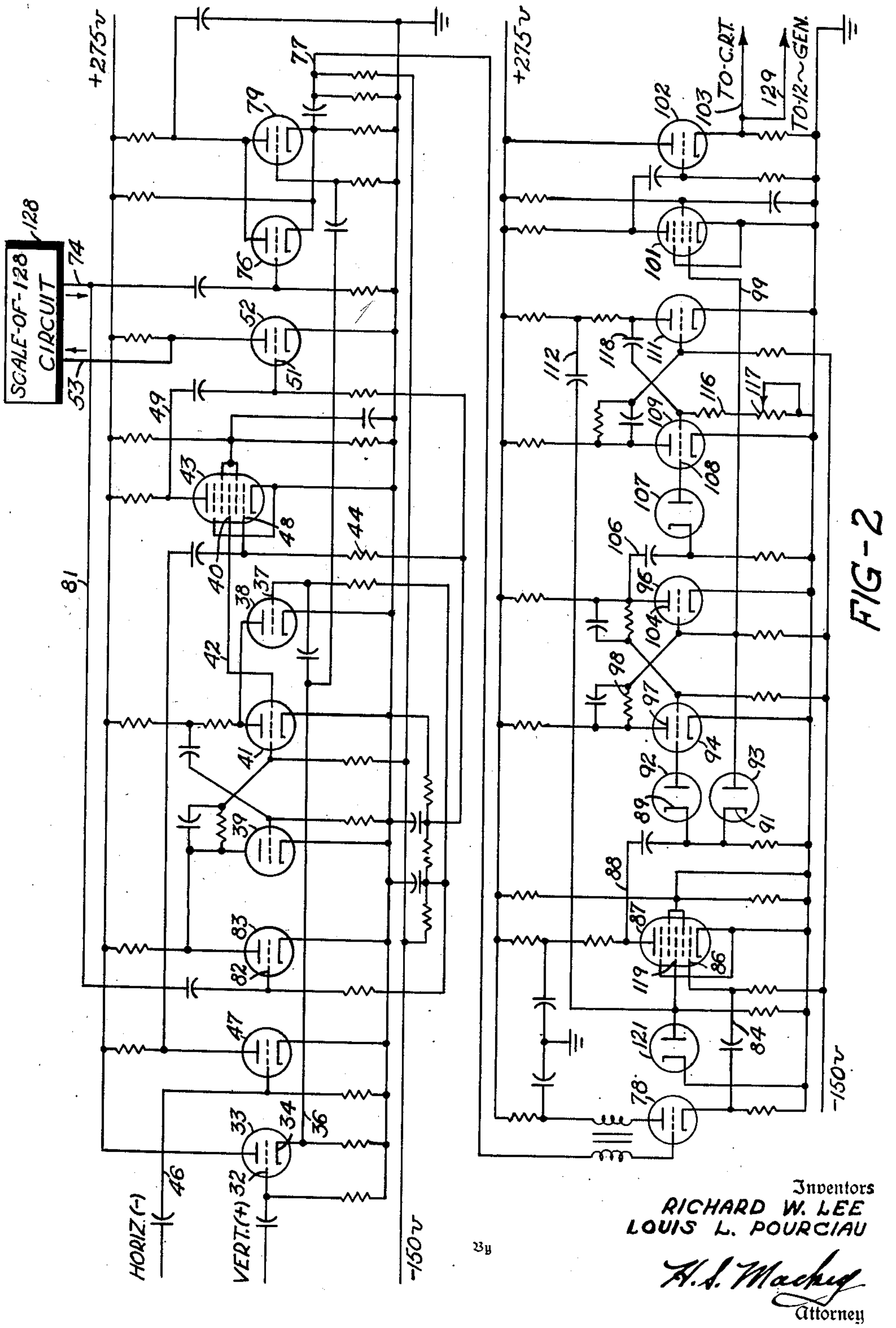
Figure 2 is the schematic wiring diagram of the switching circuits.
Figure 3:
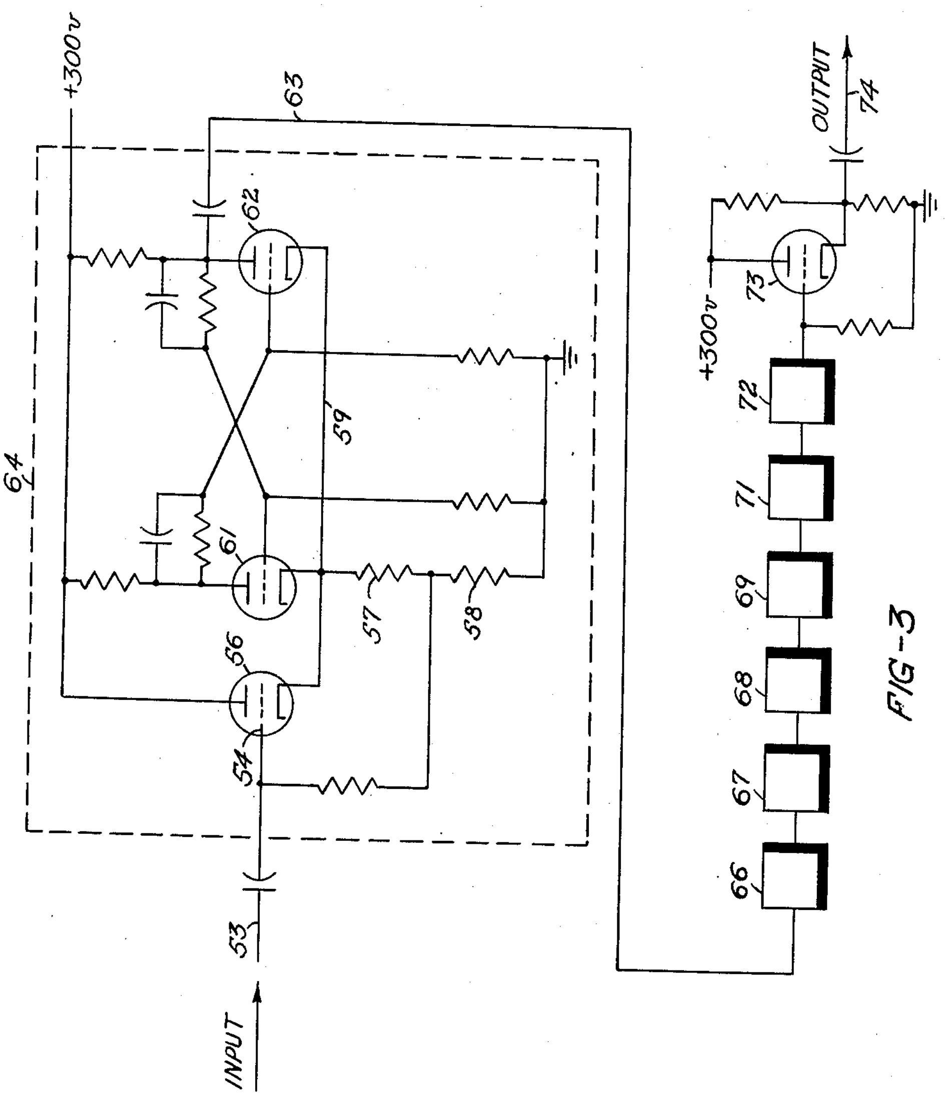
Figure 3 is the schematic wiring diagram of the scale-of-128 circuit.

The blanking control or shutter 12 consists of a blanking control switching circuit, Fig. 2, and a scale-of-128 circuit, Fig. 3.

In Fig. 2 a positive vertical synchronizing pulse from the television receiver enters control grid 32 of cathode follower tube 33, producing a positive pulse at cathode 34 which, passing through lead 36 to the grid 37 of trigger tube 38, initiates a trigger which turns on a multivibrator consisting of tubes 39 and 41. This multivibrator has a very long natural period, so that it remains turned on until turned off in a manner to be described. Tube 39 being initially conducting, the trigger pulse from tube 38 turns tube 39 off, makes tube 41 conducting, and produces a positive potential step change through lead 42 at the grid 40 of horizontal synchronization pulse switch tube 43. The control grid 48 of the latter, however, is kept negative through resistor 44, preventing this tube from conducting immediately; but when the next negative horizontal synchronizing pulse from the television receiver arrives through conductor 46, the amplifier inverter tube 47 transmits a positive pulse to the grid 48 of tube 43, making the latter conduct momentarily and impressing a negative pulse through conductor 49 on control grid 51 of amplifier inverter tube 52, stopping its plate current and producing a positive pulse in conductor 53. This conductor energizes a circuit 128 which counts 128 horizontal pulses and emits a strong positive pulse on the 128th count.

This scale-of-128 circuit is shown in Fig. 3. Successive horizontal pulses pass over the path just traced and are counted by this circuit. The initiating positive pulse, counted as number 1, entering the triode 56 through conductor 53, causes plate current flow in the triode and loads the cathode resistors 57 and 58 to such an extent that the common cathode conductor 59 is made highly positive. In the scale-of-two multivibrator, composed of tubes 62 and 61 the latter is initially in the conducting condition. The change in the potential of the cathode lead, however, is sufficient to make tube 61 nonconducting and to start current flow in tube 62, and this produces a negative pulse in conductor 63. The scale-of-two multivibrator with its trigger tube and associated equipment composes the first stage of the scale-of-128 circuit, and is shown enclosed in a dashed rectangle 64. This stage is followed by six more stages, shown as 66, 67, 68, 69, 71 and 72, each of which is identical with the described stage. Hence for simplicity of description and ease of understanding further detailed description of them is omitted. Trigger tube 56 and the trigger tubes of all the following stages are insensitive to negative pulses, so that negative pulses placed on conductor 63 and other interconnecting conductors do not operate the multivibrators but positive pulses do. As every alternate positive horizontal synchronizing pulse entering by conductor 53 results in a positive pulse being impressed on conductor 63 by the first stage 64, the number of impressed pulses is halved at the output conductor. Likewise, each following stage divides the number of pulses impressed thereon by two, so that but 1/27 as many pulses are emitted by the seventh stage 72 as are impressed on the first stage 64. That is, when the 128th pulse is impressed on the first stage the first positive pulse is emitted by the seventh stage 72.

The emitted positive pulse is transformed in cathode follower tube 73 and transmitted through conductor 74 to mixing tube 76, Fig. 2, as a positive pulse, and produces through cathode conductor 77 a strong positive pulse to energize the blocking oscillator tube 78. In addition, the positive pulse emitted by the scale-of-128 circuit through conductor 74 passes through conductor 81 to the grid 82 of trigger tube 83, which restores the multivibrator composed of tubes 39 and 41, tube 39 becoming conducting and conductor 42 becoming negative placing a negative step on the grid 40, preventing switch tube 43 from continuing to conduct current and preventing further passage of horizontal pulses to the scale-of-128 counting circuit.

Vertical synchronizing pulses passing through tube 33 and conductor 36 also energize mixing tube 79, producing positive pulses in cathode conductor 77 which energize blocking oscillator 78.

Figure 4:
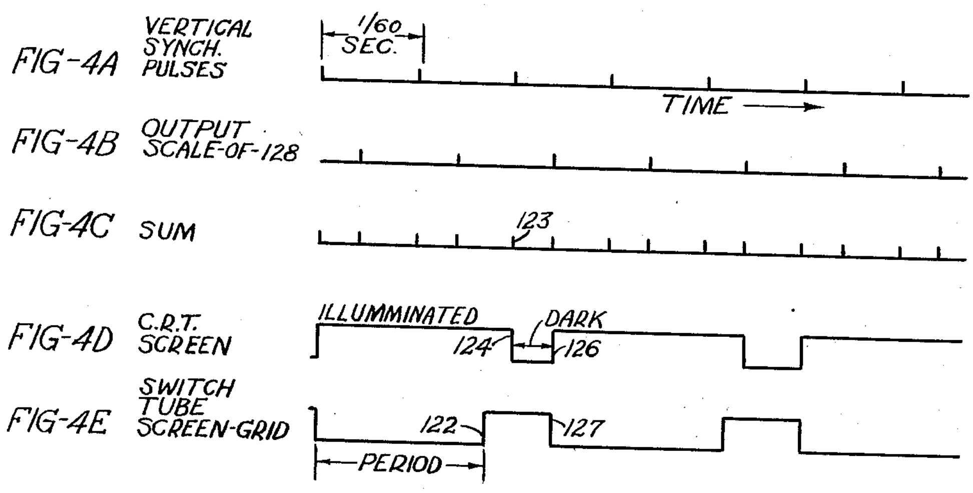
Figures 4A, 4B, 4C, 4D, 4E, 6A, 6B, 6C, 6D and 6E are graphs illustrating time relations in the recorder.

The sequence in time of operations so far described is shown in Figs. 4A, 4B and 4C. Vertical pulses at conductor 36 are indicated in Fig. 4A, pulses produced by the scale-of-128 circuit at conductor 74 are indicated in Fig. 4B, and the combination mixture, or combined series, of both pulses in cathode conductor 77 is shown in Fig. 4C. The latter also represents the effective positive peaks produced in cathode conductor 84 of blocking oscillator 78. These peaks are approximately but not precisely one-half field apart. The second peak in Fig. 4C is 128 lines or 127 horizontal line periods later than the first peak, while the third peak is on the average 135½ horizontal line periods later than peak two. Succeeding peaks occur at these two periods alternately.

While a particular type of counting circuit has been described, it will be obvious to anyone skilled in the art that other types of counting circuit may be employed to count the same number of pulses as here counted. Moreover, it is obvious from the nature of the counting method here employed that it does not depend for its successful operation on an exact count of 127 periods alternating with 135½ periods, and other divisions of the field may be employed. In fact, the smaller period may be made as small as desired so long as it is kept slightly larger than the film pulldown period. This will automatically make the longer period the length of one field minus the shorter period. It also is obvious that the counting circuit may be chosen to count the longer period rather than the shorter, when the shorter period will have a length of one field minus the longer counting period.

The aforementioned positive peaks or pulses produced in cathode conductor 84 are impressed on grid 86 of a pentagrid blanking switch tube 87. This tube is normally nonconducting, so that these positive pulses make it momentarily conductive, producing corresponding negative pulses from the plate through conductor 88 to cathodes 89 and 91 of diodes 92 and 93. These diodes are unilaterally conducting valves connected to the two sides respectively of a scale-of-two multivibrator comprising tubes 94 and 96. The output of this multivibrator consists of abrupt positive and negative changes in potential level derived from plate 97 through resistor 98 and conductor 99. These level changes are amplified and inverted by amplifier 101, transformed by cathode follower tube 102, and transmitted through conductor 103 to the cathode of the cathode ray tube 13 shown in Fig. 1. Thus the cathode will operate at either of two potential levels; at several hundred volts positive during the half-cycle of scale-of-two operation of tube 94 and near ground potential while tube 96 is conducting. While the cathode is positive the screen will be dark, or blanked out, and while the cathode is more negative the screen will emit light and its television picture will be visible.

The scale-of-two circuit produces a second output potential from plate 104 of tube 96 through conductor 106 and diode valve 107 to grid 108 of tube 109. This tube together with tube 111 constitutes a counting multivibrator having an effective period greater than any consecutive three periods of Fig. 4C and less than four of them. This multivibrator is triggered by a negative pulse at grid 108, stopping current flow in normally-conducting tube 109 and starting flow in tube 111, thus producing a more negative potential step in conductor 112 which persists for the multivibrator period dependent principally upon the magnitudes of resistors 116 and 117 in series with condenser 118, resistor 117 being variable to adjust the period. A negative step of potential thus produced on conductor 112 is conducted thereby to the screen grid 119 of the tube 87, making this tube nonconductive for the duration of the potential step. This permits the cathode ray tube to be illuminated for periods equal to four of the successive periods of Fig. 4C, then to be blanked during one. Diode 121 is for the purpose of draining positive surges of higher than ground potential.

An overall understanding of the operation of the circuits of Fig. 2 may be obtained with the aid of Figs. 4A to 4E inclusive. Vertical synchronizing pulses operate the 110,000 μs single-stroke multivibrator and are also transmitted through the mixer tube 79 to the blocking oscillator tube 78. The operation of the multivibrator permits the horizontal switch tube 43 to pass horizontal synchronizing pulses to the scale-of-128 counting circuit 128, which counts 128 horizontal pulses and produces a final pulse which is transmitted through the mixer tube 76 to the blocking oscillator tube 78. The time relation of these vertical pulses and of the output pulses of circuit 128 is shown in Figs. 4A and 4B respectively, while their mixture in the mixing tubes and emergence as a single composite series from the blocking oscillator is indicated in Fig. 4C.

The counting circuit stops its own input by transmitting its 128th pulse also to the 110,000 μs single-stroke multivibrator, restoring it to normal condition. This action, through the horizontal switch tube, stops further passage of horizontal pulses to the counting circuit.

The positive pulses emitted from the blocking oscillator tube 78 as a series such as illustrated in Fig. 4C all are transmitted to the blanking switch tube 87 and if the latter is in conductive condition pass through it to a scale-of-two blanking multivibrator. The two positions of the latter control the cathode ray tube, one position permitting illumination and the other position causing blanking. This multivibrator also emits positive or negative pulses when passing from one position to the other, and the negative pulses, which are emitted when it passes to the illumination position, pass to a 28,000 μs single-stroke multivibrator, operating it. The latter thereupon renders the blanking switch tube 87 nonconductive for a period which is greater than three and less than four positive pulse periods then, restoring itself, again permits the blanking switch tube to conduct.

Tracing these actions, reference number 122 in Fig. 4E indicates an increase of potential of the grid 119 of the blanking switch tube caused by the single-stroke multivibrator, permitting the switch tube to conduct any positive pulses thereafter impressed upon its grid 86. The next positive pulse impressed thereupon causes operation of the scale-of-two multivibrator and blanking of the cathode ray tube as indicated at reference number 124, Fig. 4D. The next positive pulse emitted by the blocking oscillator tube again operates the scale-of-two multivibrator, and initiates illumination of the cathode ray tube as indicated at reference figure 126 Fig. 4D. It also starts the stroke of the single-stroke multivibrator as indicated at reference figure 127, Fig. 4E.

There results then an illumination at the cathode ray tube screen for a period equal to four of the periods between the positive pulse signals and a darkening of the screen for one such period, this particular period being of a length equal to the sum of 127 horizontal line periods, or to a length equal to that of one field minus 127 line periods, alternately.

Figure 5:
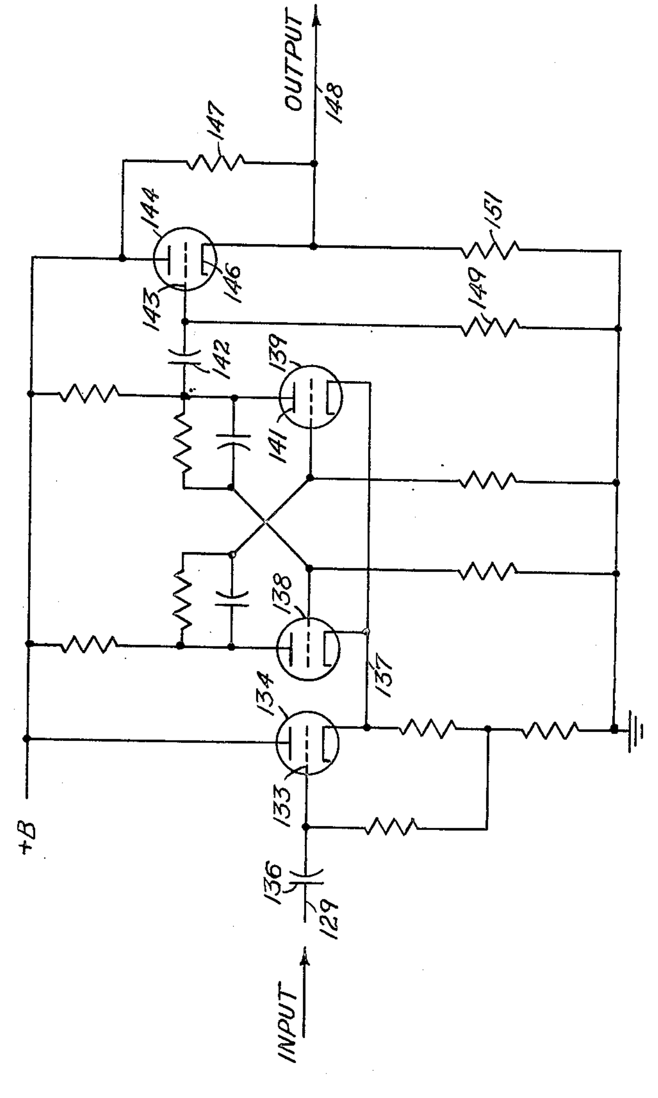
Figure 5 is a schematic wiring diagram of the 12-cycle generator.

The same output energy of the blanking control circuit which controls the cathode ray tube is also utilized to actuate a scale-of-two circuit, which selects every other cycle of the 24-cycle blanking pulses and produces therefrom 12-cycle pips. This scale-of-two circuit is shown as 14 in Fig. 1 and its schematic circuit is illustrated in Fig. 5. Conductor 129, Figs. 1, 2 and 5 is connected through a blocking condenser 136, Fig. 5, to the grid 133 of a trigger tube 134. When a positive pulse occurs in conductors 103 and 129, blanking the cathode ray tube, it also produces a sharp increase of current in the trigger tube 134, which in turn through cathode connection 137 places a positive charge on the cathodes of both scale-of-two multivibrator tubes 138 and 139, with the result that whichever one is conducting at the time it is opened, and the other one starts to conduct. This produces a sudden positive or negative change in the potential of plate 141, which is differentiated by small condenser 142 to a pip and placed on grid 143 of cathode follower tube 144. A high resistance 147 is connected from plate to cathode around tube 144, while the grid 143 is leaked to ground through leak resistor 149. A cathode follower resistor 151 is provided with the result that tube 144 is normally cut off. Negative charges on the grid 143 therefore have no effect, but positive charges produce positive pips on cathode 146 and at conductor 148. These pips are led to a comparator of a suitable type as mentioned above and as indicated at conductor 148 in Fig. 1.

It is obvious that this circuit will have 180° ambiguity since the initial input pulse will be as likely to find one multivibrator tube closed as the other. But since the intermittent movement frequency is 24 c. p. s., the 12 c. p. s. comparator frequency with 180° ambiguity gives a result as unambiguous as if the multivibrator always started with the same tube closed. However, an ambiguity of plus or minus some four horizontal line periods or 254 $\mu$s results from random selection at the start of either a vertical pulse, Fig. 4A, or a scale-of-128 output pulse, Fig. 4B. This phase uncertainty, however, can easily be cared for in design by making the period during which the film is stationary somewhat longer than the period of cathode ray tube illumination.

Figure 6:
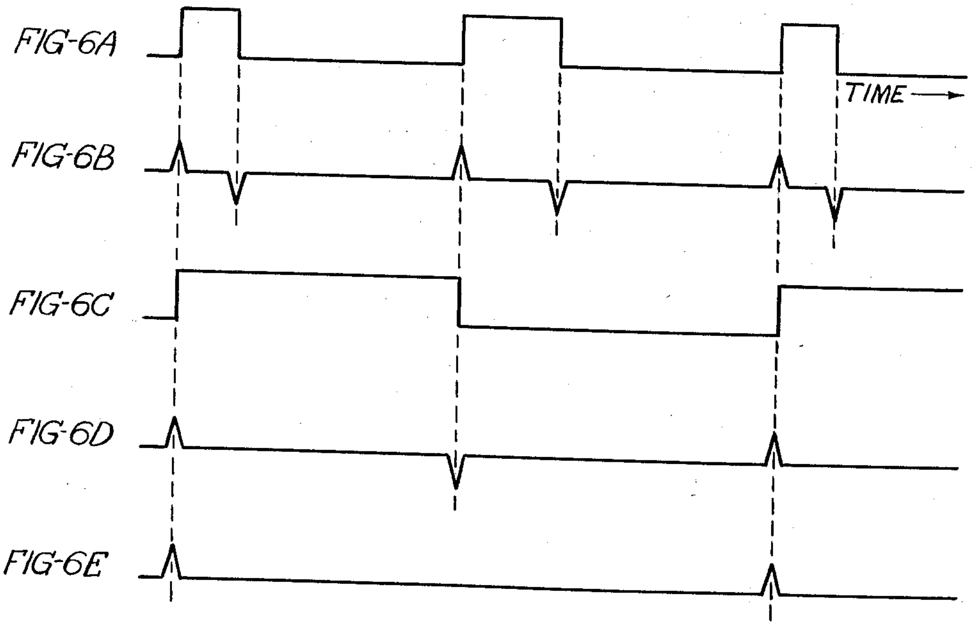

The sequence of operations in the scale-of-two circuit of Fig. 5 is more clearly indicated in Figs. 6A to 6E. In Fig. 6A are illustrated the unequal square positive pulses transmitted through conductors 103 and 129 to the cathode ray tube and to the 12-cycle pip generator of Fig. 5. After differentiation by condenser 136 the signals are as illustrated in Fig. 6B. The output at plate 141 of the multivibrator is illustrated in Fig. 6C, and after differentiation by condenser 142 in Fig. 6D. The clipping action of tube 144 results in the 12-cycle pips of Fig. 6E.

What is claimed is:

1. An electronic shutter adapted for use in a system wherein received television images are periodically recorded on an intermittently actuated film strip comprising, a counting circuit successively operated by a series of received television horizontal synchronizing pulses for a period of time greater than the pulldown period resulting from the intermittent actuation of said film strip but less than the period of one television scan minus the pulldown period, producing an output signal at the cessation of said operating period, switch means initiating the operation of said counting circuit, means for operating said switch means by the joint control of a television vertical synchronizing pulse and a television horizontal synchronizing pulse succeeding the initiation of the vertical synchronizing pulse, gating means for producing signals of alternate potential levels, means for impressing said alternate potential level signals on a control electrode of a cathode ray tube producing television images, and means operating said gating means to its alternate potential levels in accordance with selected ones of said vertical synchronizing pulses and output signals produced by said counting circuits.

2. An electronic shutter adapted for use in a system wherein received television images are periodically recorded on an intermittently actuated film strip comprising, a counting circuit successively operated by a series of received television horizontal synchronizing pulses for a period of time greater than the pulldown period resulting from the intermittent actuation of said film strip but less than the period of one television scan minus the pulldown period, producing an output signal at the cessation of said operating period, switch means initiating the operation of said counting circuit, means for operating said switch means by the joint control of a television vertical synchronizing pulse and a television horizontal synchronizing pulse succeeding the initiation of the vertical synchronizing pulse, signal generating means having said vertical synchronizing pulses and the output signals of said counting circuit applied thereto generating signals occurring at time intervals corresponding to the alternate occurrence of vertical synchronizing pulses and the output signals of said counting circuit, gating means operated by selected signals generated by said signal generating means producing signals of alternate potential levels, and circuit means for impressing said signals of alternate potential levels on a control electrode of a cathode ray tube producing the television images.

3. An electronic shutter adapted for use in a system wherein received television images are periodically recorded on an intermittently actuated film strip comprising, a counting circuit successively operated by a series of received television horizontal synchronizing pulses for a period of time greater than the pulldown period resulting from the intermittent actuation of said film strip but less than the period of one television scan minus the pulldown period, producing an output signal at the cessation of said operating period, a normally inoperative switch tube connected to impress said horizontal synchronizing pulses on said counting circuit for operation thereof, circuit means for rendering said switch tube operative by the joint control of a television vertical synchronizing pulse and a horizontal synchronizing pulse succeeding the initiation of the vertical synchronizing pulse, signal generating means controlled by said vertical synchronizing pulses and the output signals of said counting circuit generating signals occurring at time intervals corresponding to the alternate occurrence of vertical synchronizing pulses and the output signals of said counting circuit, gating means operated by selected signals generated by said signal generating means producing signals of alternate potential levels and circuit means for impressing said signals of alternate potential levels on a control electrode of a cathode ray tube producing the television images.

4. An electronic shutter adapted for use in a system wherein received television images are periodically recorded on an intermittently actuated film strip comprising, a counting circuit successively operated by a series of received television horizontal synchronizing pulses for a period of time greater than the pulldown period resulting from the intermittent actuation of said film strip but less than the period of one television scan minus the pulldown period, producing an output signal at the cessation of said operating period, switching means for initiating the operation of said counting circuit jointly controlled by a television vertical synchronizing pulse and a television horizontal synchronizing pulse succeeding the initiation of the vertical pulse, signal generating means controlled by said vertical synchronizing pulses and the output signals of said counting circuit, generating signals occurring at time intervals corresponding to the alternate occurrence of vertical synchronizing pulses and the output signals of said counting circuit, a gating circuit operated by successive signals impressed thereon to produce signals of alternate potential levels, a switching means connected between said signal generating means and said gating circuit for transferring said generated signals to said gating circuit when in conductive condition and for inhibiting the transmission of signals when in nonconductive condition, a trigger circuit having a period of operation greater than three of the time periods existing between alternate vertical synchronizing pulses and output signals of said counting circuit but less than four of such periods, means for initiating the operation of said trigger circuit by one of the alternate potential levels produced by said gating circuit, circuit means for rendering said second mentioned switching means nonconductive during the operation of said trigger circuit and circuit means for impressing the alternate potential levels produced by said gating circuit on a control electrode of a cathode ray tube which produces the television images.

5. An electronic shutter adapted for use in a system wherein received television images are periodically recorded on an intermittently actuated film strip comprising, a counting circuit successively operated by a series of received television horizontal synchronizing pulses for a period of time greater than the pulldown period resulting from the intermittent actuation of said film strip but less than the period of one television scan minus the pulldown period, producing an output signal at the cessation of said operating period, a normally inoperative switch tube connected to impress said horizontal synchroniizng pulses on said counting circuit for operation thereof, circuit means for rendering said switch tube operative by the joint control of a television vertical synchronizing pulse and a horizontal synchronizing pulse succeeding the initiation of the vertical synchronizing pulse, signal generating means controlled by said vertical synchronizing pulses and the output signals of said counting circuit, generating signals at time intervals corresponding to the alternate occurrence of vertical synchronizing pulses and the output signals of said counting circuit, a gating circuit operative by successive signals impressed thereon to produce signals of alternate potential levels, a switching means connected between said signal generating means and said gating circuit for transferring said generated signals to said gating circuit when in operative condition and for inhibiting the transmission of signals when in nonconductive condition, a trigger circuit having a time of operation greater than three of the time periods existing between alternate vertical synchronizing pulses and output signals of said counting circuit but less than four of such periods, means for initiating the operation of said trigger circuit by one of the alternate potential levels produced by said gating circuit, circuit means for rendering said switching means nonconductive during the time of operation of said trigger circuit and circuit means for impressing the alternate potential levels produced by said gating circuit on a control electrode of a cathode ray tube which produces the television images.

6. An electronic shutter adapted for use in a system wherein received television images are periodically recorded on an intermittently actuated film strip comprising, a circuit successively counting the received television horizontal synchronizing pulses for a period of time which is greater than the pulldown time resulting from the intermittent actuation of said film strip but which is less than the period of one television scan minus the pulldown period, said circuit producing an output signal pulse at the termination of said period of time, means for combining in timed relation the received television vertical synchronizing pulses and the output pulse signals of said circuit thereby producing a signal whose time duration between successive pulse signals is alternately the period of operation of said circuit and the period of one television scan minus the period of operation of said circuit, and means operative during selected ones of the time duration periods between successive pulse signals for inhibiting the display of television images.

7. An electronic shutter adapted for use in a system wherein received television images are periodically recorded on an intermittently actuated film strip comprising, a circuit successively counting the received television horizontal synchronizing pulses for a period of time which is greater than the pulldown time resulting from the intermittent actuation of said film strip but which is less than the period of one television scan minus the pulldown period, said counting circuit producing an output signal pulse at the termination of said period of time, means for combining in timed relation the received television vertical synchronizing pulses and the output pulse signals of said counting circuit thereby producing a signal whose time duration between successive pulse signals is alternately the period of operation of said counting circuit and the period of one television scan minus the period of operation of said counting circuit, gating means operative during selected ones of said time duration periods between successive pulse signals for inhibiting the display of television images and means operative to select every fifth such period to operate said gating means.

8. An electronic shutter adapted for use in a system wherein received television images are periodically recorded on an intermittently actuated film strip comprising, a counting circuit successively counting the received television horizontal synchronizing pulses for a period of time which is greater than the pulldown time resulting from the intermittent actuation of said film strip but which is less than the period of one television scan minus the pulldown period, said counting circuit producing an output signal pulse at the termination of said period of time, means operative conjointly by a received television vertical synchronizing pulse and a received television horizontal synchronizing pulse initiating the operation of said counting circuit, means operative by the output signal pulse for terminating the operation thereof, means for combining in timed relation the received television vertical synchronizing pulses and the output pulse signals of said counting circuit thereby producing a signal whose time duration between successive pulse signals is alternately the period of operation of said counting circuit and the period of one television scan minus the period of operation of said counting circuit, and means operative during selected ones of said time duration periods between successive pulse signals for inhibiting the display of television images.

9. An electronic shutter adapted for use in a system wherein received television images are periodically recorded on an intermittently actuated film strip comprising, a counting circuit successively counting the received television horizontal synchronizing pulses for a period of time which is greater than the pulldown time resulting from the intermittent actuation of said film strip but which is less than the period of one television scan minus the pulldown period, said counting circuit producing an output signal pulse at the termination of said period of time, means operative conjointly by a received television vertical synchronizing pulse and a received television horizontal synchronizing pulse initiating the operation of said counting circuit, means operative by the output signal pulse for terminating the operation thereof, means for combining in timed relation the received television vertical synchronizing pulses and output pulse signals of said counting circuit thereby producing a signal whose time duration between successive pulse signals is alternately the period of operation of said counting circuit and the period of one television scan minus the period of operation of said counting circuit, gating means operative during selected ones of said time duration periods between successive pulse signals for inhibiting the display of television images and means operative to select every fifth such period to operate said gating means.

10. An electronic shutter adapted for use in a system wherein received television images are periodically recorded on an intermittently actuated film strip comprising, a counting circuit successively counting the received television horizontal synchronizing pulses for a period of time which is greater than the pulldown time resulting from the intermittent actuation of said film strip but which is less than the period of one television scan minus the pulldown period, said counting circuit producing an output signal pulse at the termination of said period of time, means operative conjointly by a received television vertical synchronizing pulse and a received television horizontal synchronizing pulse initiating the operation of said counting circuit, means operative by the output signal pulse for terminating the operation thereof, means for combining in timed relation the received television vertical synchronizing pulses and the output pulse signals of said counting circuit thereby producing a train of pulse signals whose alternate times of occurrence are the period of operation of said counting circuit and the period of one television scan minus the period of operation of said counting circuit, gating means operated by selected ones of said train of pulse signals producing signals of alternate potential levels and circuit means for impressing said signals of alternate potential levels on a control electrode of a cathode ray tube producing the television images.

11. An electronic shutter adapted for use in a system wherein received television images are periodically recorded on an intermittently actuated film strip comprising, a counting circuit successively counting the received television horizontal synchronizing pulses for a period of time which is greater than the pulldown time resulting from the intermittent actuation of said film strip but which is less than the period of one television scan minus the pulldown period, said counting circuit producing an output signal pulse at the termination of said period of time, means operative conjointly by a received television vertical synchronizing pulse and a received television horizontal synchronizing pulse initiating the operation of said counting circuit, means operative by the output signal pulse for terminating the operation thereof, means for combining in timed relation the received television vertical synchronizing pulses and the output pulse signals of said counting circuit thereby producing a train of pulse signals whose alternate times of occurrence are the period of operation of said counting circuit and the period of one television scan minus the period of operation of said counting circuit, a gating circuit operated by successive signals impressed thereon to produce signals of alternate potential levels, a switching means interposed between the means for producing said train of pulse signals and said gating circuit for transferring signals of said train to said gating circuit when in conductive condition and inhibiting the transmission of said train of signals when in nonconductive condition, a trigger circuit having a period of operation greater than three of the time intervals existing between successive pulse signals of said train of signals but less than four of such intervals, means for initiating the operation of said trigger circuit by one of the alternate potential levels produced by said gating circuit, means for rendering said switching means nonconductive during the operation of said trigger circuit, and circuit means for impressing the alternate potential levels produced by said gating circuit on a control electrode of a cathode ray tube which produces the television images.

12. An electronic shutter adapted for use in a system wherein received television images are periodically recorded on an intermittently actuated film strip comprising, means for producing a series of pulse signals each of which succeeds respective received television vertical synchronizing signals by a time interval which is greater than the pulldown time resulting from the intermittent actuation of said film strip but which is less than the period of one television scan minus the pulldown period, means for combining in timed relation the received television synchronizing pulses and said series of pulses thereby producing a train of pulses whose alternate times of occurrence with respect to each preceding pulse are the time interval by which each of said series of pulses succeeds a respective vertical synchronizing pulse and the period of one television scan minus said last mentioned time interval, means for initiating illumination of a cathode ray tube screen on which said television images are displayed in accordance with the time of occurrence of one of said train of pulses, means for terminating said illumination in accordance with the time of occurrence of the fourth succeeding pulse of said train of pulses and means for reinitiating illumination of said screen at the time of occurrence of the next succeeding pulse of said pulse train.

13. An electronic shutter adapted for use in a system wherein received television images are periodically recorded on an intermittently actuated film strip comprising, means for producing a series of pulse signals each of which succeeds respective received television vertical synchronizing signals by a time interval which is greater than the pulldown time resulting from the intermittent actuation of said film strip but which is less than the period of one television scan minus the pulldown period, means for combining in timed relation the received television synchronizing pulses and said series of pulses thereby producing a train of pulses whose alternate times of occurrence with respect to each preceding pulse are the time interval by which each of said series of pulses succeeds a respective vertical synchronizing pulse and the period of one television scan minus said last mentioned time interval, a gating circuit operated by successive signals impressed thereon to produce signals of alternate potential levels, a switching means interposed between the means for producing said train of pulse signals and said gating circuit for transferring signals of said train to said gating circuit when in conductive condition and inhibiting the transmission of said train of signals when in nonconductive condition, a trigger circuit having a period of operation greater than three of the time intervals existing between successive pulse signals of said train of signals but less than four of such intervals, means for initiating the operation of said trigger circuit by one of the alternate potential levels produced by said gating circuit means for rendering said switching means nonconductive during the operation of said trigger circuit, and means for impressing the alternate potential levels produced by said gating circuit on a control electrode of a cathode ray tube which produces the television images.

RICHARD W. LEE.
LOUIS L. POURCIAU.

REFERENCES CITED

The following references are of record in the file of this patent:

UNITED STATES PATENTS

| Number | Name | Date |
|---|---|---|
| 2,251,786 | Epstein | Aug. 5, 1941 |
| 2,373,114 | Goldsmith | Apr. 10, 1945 |
| 2,406,096 | Morrison | Aug. 20, 1946 |
| 2,430,547 | Anderson et al. | Nov. 11, 1947 |
| 2,454,089 | Rea | Nov. 16, 1948 |
| 2,485,886 | Johnstone | Oct. 25, 1949 |
| 2,493,627 | Frosdoff | Jan. 3, 1950 |
| 2,504,734 | Schmidling | Apr. 18, 1950 |
| 2,525,891 | Garman et al. | Oct. 17, 1950 |

FOREIGN PATENTS

| Number | Country | Date |
|---|---|---|
| 883,910 | France | July 26, 1943 |